United States Patent [19]

Oba et al.

[11] Patent Number: 4,980,910

[45] Date of Patent: Dec. 25, 1990

[54] PORTABLE AUTOMATIC DIALING UNIT

[75] Inventors: Toshiro Oba; Eichika Matsuda, both of Nara; Hisao Kunita, Mie, all of Japan

[73] Assignee: Sharp Kabushiki Kaisha, Osaka, Japan

[21] Appl. No.: 343,791

[22] Filed: Apr. 27, 1989

[30] Foreign Application Priority Data

Apr. 28, 1988 [JP] Japan ................................ 63-106654
Apr. 28, 1988 [JP] Japan ................................ 63-106652

[51] Int. Cl.$^5$ ........................................... H04M 1/272
[52] U.S. Cl. ..................................... 379/355; 379/354
[58] Field of Search ................ 379/354, 355, 357, 96, 379/216; 235/382

[56] References Cited

U.S. PATENT DOCUMENTS

| | | | |
|---|---|---|---|
| 4,117,542 | 9/1978 | Klausner | 379/355 X |
| 4,201,887 | 5/1980 | Burns | 379/96 |
| 4,800,255 | 1/1989 | Imran | 235/382 |

OTHER PUBLICATIONS

Radio Shack 1987 Catalog, 12-1986, p. 153.
Radio Shack 1985 Catalog, 12-1984, p. 86.

*Primary Examiner*—James L. Dwyer

[57] ABSTRACT

In a portable dialing unit dial data inputted through a keyboard are registered in an internal memory. When desired dial data is retrieved from the registered dial data and a dial key is pressed, the retrieved dial data is converted to corresponding tone signals and supplied to a speaker. The speaker outputs corresponding tones. A portable automatic dialing unit is acoustically coupled to a mouthpiece of a telephone set. The tones outputted from the speaker are again converted to tone signals by the telephone set, and transmitted to a telephone line. A switchboard is driven by the tone signals. The unit includes two modes: The first mode includes registered target numbers and the second mode includes data for special telephone service. The target number in the first mode can be inserted into any position of the data in the second mode.

7 Claims, 7 Drawing Sheets

FIG. 1
(a) TRANSMIT TARGET TELEPHONE NUMBER FOLLOWING SSN NUMBER

| KEY MANIPULATION | CONTENT OF MANIPULATION | FUNCTIONAL OPERATION |
|---|---|---|
| [V] (SEARCH KEY) | SEARCH FOR TARGET TELEPHONE NUMBER | SEARCH FOR "YAMADA: 03-123-4567" |
| [SSN] | SEARCH FOR SSN NUMBER FOR USE | SEARCH FOR "NIHON TELECOM: 0088" |
| [DIAL] | TRANSMIT SELECTED SSN NUMBER AND TARGET TELEPHONE NUMBER IN SUCCESSION | TRANSMIT "0088 03 123 4567" |

FIG. 1
(b) TRANSMIT TONES FOR TARGET TELEPHONE NUMBER AND THEN TRANSMIT TONES FOR SSN DATA

| KEY MANIPULATION | CONTENT OF MANIPULATION | FUNCTIONAL OPERATION |
|---|---|---|
| [V] (SEARCH KEY) | SEARCH FOR TARGET TELEPHONE NUMBER | SEARCH FOR "HOME: 06-123-4567" |
| [DIAL] | TRANSMIT SELECTED TELEPHONE NUMBER | TRANSMIT "06 123 4567" |
| [SSN] | SEACH FOR SSN NUMBER FOR USE | SEARCH FOR CONTROL CODE "ANS: #234#PPP#" OF ANSWERING MACHINE |
| [DIAL] | TRANSMIT SSN NUMBER | TRANSMIT "#234#PPP1#" |

FIG. 4
(a) REGISTRATION OF SSN DATA

| KEY MANIPULATION | DISPLAY | OPERATION CONTENT |
|---|---|---|
| ON | NAME ? | APPLY POWER (SET INITIAL STATE) |
| SSN | SSN1 ? | PREPARE FOR SSN REGISTRATION (REGISTRATION OF NUMBER FOR MAKING CREDIT CALL THROUGH NIHON KOSOKU TSUSHIN) |
| N·K·TUUSIN ▼ | N.K.TU US IN - | INPUT NAME PART AND MOVE CURSOR POSITION TO NUMBER PART THROUGH CURSOR MOVING KEY |
| 0070-22 TARGET | N.K.TU US IN 00 70-22[ ]- | INPUT NUMBER PART (PRESS TARGET KEY IN POSITION FOR INSERTING TARGET TELEPHONE NUMBER) |
| PAUSE PAUSE ···· | 00 70-22[ ]PP P- | INPUT PAUSE CODE FOR REQUIRED TIME IN PART FOR GUIDE ANNOUNCEMENT |
| 03-123-4567 ✕8901 | P03-123-4567 ✕8901 | INPUT NECESSARY NUMBER |
| ENTER | NAME ? | TERMINATE SSN REGISTRATION |

FIG. 4
(b) TRANSMIT DIAL DATA THROUGH SSN FUNCTION

| KEY MANIPULATION | DISPLAY | OPERATION CONTENT |
|---|---|---|
| C | NAME ? | SET INITIAL STATE THROUGH CLEAR KEY |
| H ▼ | HA YA KA WA 03-204-5521 | SEARCH FOR NAME AND TELEPHONE NUMBER |
| SSN | N.K.TU US IN 00 70-22[ ]PP· | SEARCH FOR DESIGNATION AND SSN DATA |
| DIAL | DIALING 00 70-22[03- | PRESS DIAL KEY TO TRANSMIT TONES FOR SERIES OF DIAL DATA INCLUDING TARGET TELEPHONE NUMBER AND DISPLAY CONTENTS CORRESPONDING TO TONES (CONTENT OF TRANSMISSION) 0070 22 03 204 5521 PPP 03 123 4567 ✕ 8901 TARGET NUMBER / CONTRACT TELEPHONE NUMBER PAUSE  PASSWORD CREDIT CALL SERVICE CODE ACCESS CODE OF NIHON KOSOKU TSUSHIN |

PORTABLE AUTOMATIC DIALING UNIT

BACKGROUND OF THE INVENTION

1. Field of the Invention

The present invention relates to a portable automatic dialing unit, and more specifically, it relates to a portable automatic dialing unit which converts previously registered data to corresponding tones and outputs the same from a speaker, so that the tones are transmitted to a telephone line to drive a telephone switchboard.

2. Description of the Prior Art

In order to make a telephone call, it has been generally necessary to dial a target telephone number or input a password. However, with recent development of telephone service, digits of such dialing have increased to cause complications in dialing. Further, it is difficult to keep a lot of telephone numbers in mind.

There has recently been proposed a portable automatic dialing unit, which has a storage function for serving as a telephone directory and a function of automatically transmitting tones. This portable automatic dialing unit comprises a key manipulation part and a display, similarly to the so-called electronic calculator. The key manipulation part includes various keys for inputting and retrieving data. Telephone numbers and data for retrieving the same, such as personal names, are inputted through the key manipulation part and stored in an internal memory such as a RAM, for example. In order to make a telephone call, the user manipulates a retrieval key provided in the key manipulation part, so that a corresponding telephone number is read from the memory and displayed on the display. The user further presses a key for transmitting tones, so that data of the retrieved telephone number is converted to corresponding tone signals. The tone signals are audio frequency signals having the same frequencies as tone signals transmitted to a telephone line through pushbutton manipulation in the so-called pushbutton telephone set. The tone signals are supplied to an internally provided speaker, and outputted to the exterior as tones. At this time, the portable automatic dialing unit is attached to the mouthpiece of a telephone receiver, so that the tone signals are transmitted to a telephone line through the telephone receiver. The tone signals, which are audio frequency signals of the same frequencies as those of a pushbutton dialing telephone set as hereinabove described, drives a telephone switchboard to connect the telephone line to another telephone set having the number corresponding to the tone signals. Thus, the portable automatic dialing unit is extremely convenient since the same requires no dialing operation and can store a lot of telephone numbers and data relating to the same.

In recent years, a variety of special telephone service is carried out in addition to general service for telephone communication. In order to use such special telephone service, it is necessary to transmit various dial data such as an access code of a telephone company, a password etc., in addition to a target telephone number. A conventional portable automatic dialing unit has an SSN (Special Service Number) function of registering, retrieving and automatically transmitting dial data required for such special telephone service, in addition to a function of registering, retrieving and automatically transmitting data of general telephone numbers.

Figure 1A:
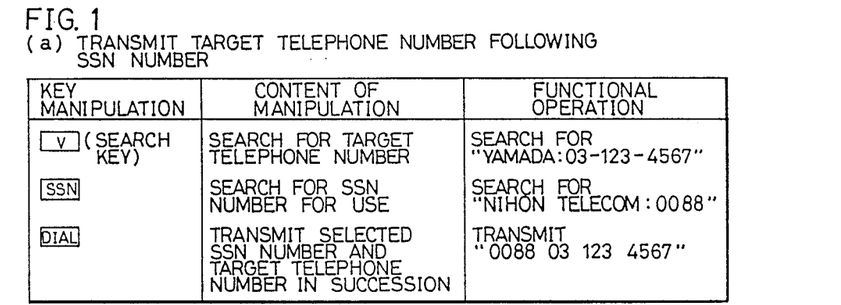
FIGS. 1(a) and 1(b) illustrates SSN functions in conventional portable automatic dialing units.
Figure 1B:
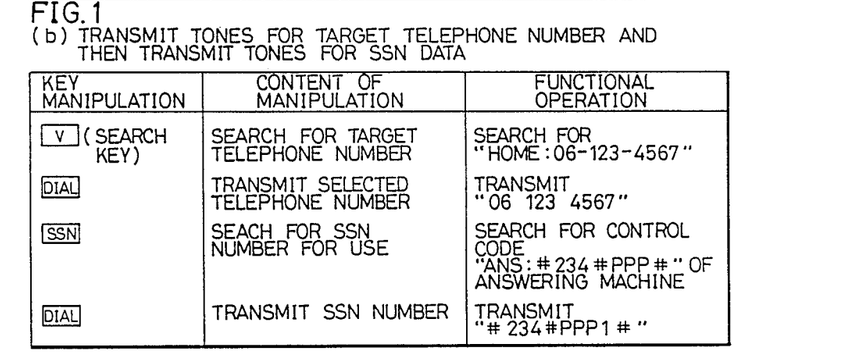

FIGS. 1(a) and 1(b) shows SSN functions in conventional portable automatic dialing units. As shown in FIGS. 1(a) and (b), the conventional portable automatic dialing units have SSN functions of the following two types:

(1) transmitting a target telephone number following a number registered in an SSN mode; and (2) previously transmitting a target telephone number and thereafter transmitting a number registered in the SSN mode.

On the other hand, recently there has been the need that a target telephone number must be inserted in dial data for special telephone service, in order to use such special telephone service. However, the conventional portable automatic dialing unit cannot cope with such case since the dial data for special telephone service can merely precede or follow the target telephone number according to its SSN function.

In order to make a long-distance call through the public telephone system in the U.S., it is necessary to add an identification number "1" to the head of a target telephone number to indicate that this is a long-distance call. Further, there is special telephone service called calling card dialing service in the U.S. In this calling card dialing service, a telephone company issues a calling card (a kind of a credit card relating to telephone) to a customer. A calling card number allocated to each customer is recorded in this calling card. The customer dials this calling card number following a target telephone number, so that the charge for the current telephone call is automatically paid from the customer's bank account. Through such calling card service, therefore, the customer can make a telephone call from a public telephone in Los Angeles to New York, for example, with no coins. The telephone charges are billed monthly in a single sum.

At present, some of public telephones are provided with card readers, while others generally have no such card readers. In the former case, the card reader can read a calling card number to automatically transmit the same to a center. Thus, it is not necessary to dial the calling card number. In a general public telephone having no such card reader, on the other hand, the user must dial his calling card number following a target telephone number. While the way of making a telephone call through such calling card service is slightly varied with telephone companies, an identification number "0" for the calling card service must be added to the head of the target telephone number in any case, whether it is a long-distance call or a local call. In order to make a long-distance call through the calling card service, therefore, the identification number "0" must be added to the head of the target telephone number in place of the identification number "1" in the case of the aforementioned general long-distance call.

However, a conventional portable automatic dialing unit cannot cope with such replacement of the identification numbers "1" and "0". Therefore, only target telephone numbers are stored in the unit and the user manually dials "1" at the head for making a general long-distance call, while manually dialing "0" at the head and the card number at the end for making a long-distance call through calling card service. Thus, the conventional portable automatic dialing unit still requires troublesome dialing operation in the case of a long-distance call.

SUMMARY OF THE INVENTION

Accordingly, an object of the present invention is to provide a portable automatic dialing unit which can insert a target telephone number in an arbitrary position of dial data for special telephone service for transmitting the same.

Another object of the present invention is to provide a portable automatic dialing unit which can automatically transmit entire dial data whether the call is a general long-distance call or a long-distance call through special telephone service such as the aforementioned calling data dialing service.

A portable automatic dialing unit according to the present invention includes data input means for inputting dial data and data relating thereto. There are registration means for registering the data inputted by the data input means and retrieval means for retrieving desired dial data from the dial data registered in the registration means. Tone signal producing means are included for producing corresponding tone signals on the basis of the dial data retrieved by the retrieval means. Also there is a speaker for converting the tone signals to tones and outputting the same to the exterior and mode switching means for switching an operation mode between first and second modes. The first mode is adapted to register and retrieve target telephone number data, and the second mode is adapted to register and retrieve dial data for special telephone service. The data input means includes means for inputting insertion position specifying data indicating a position of the dial data registered in the second mode for inserting the target telephone number. The dial tone signal producing means includes data insertion means for inserting the target telephone number data retrieved in the first mode in the position specified by the insertion position specifying data when the dial data retrieved in the second mode include the insertion position specifying data.

In another aspect of the present invention, a predetermined identification number is added to a telephone number for a long-distance call registered in the first mode. The tone signal producing means includes deletion means for deleting the identification number from a retrieved telephone number for a long-distance call when this telephone number is retrieved in the first mode and dial data for prescribed special telephone service is retrieved in the second mode.

According to the present invention, a general telephone number can be inserted in an arbitrary position of dial data for special telephone service for automatically transmitting dial tones, whereby the inventive portable automatic dialing unit can flexibly cope with a variety of recently implemented new telephone service, to promote convenience for the user.

According to another aspect of the present invention, tones can be regularly automatically transmitted whether the call is a general long-distance call or a long-distance call through special telephone service, to completely remove necessity for dialing operation.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
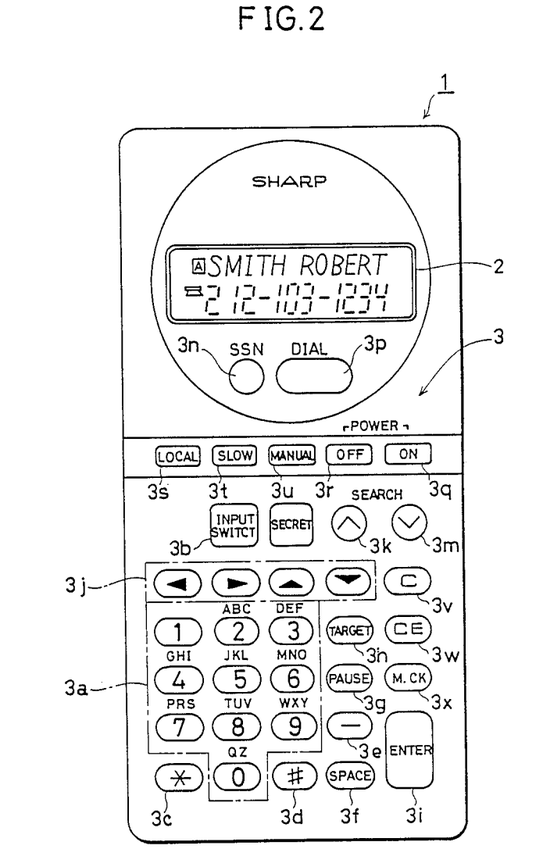
FIG. 2 is a front elevational view showing the appearance of a portable automatic dialing unit according to an embodiment of the present invention.

With reference to FIG. 2, visual structure of a portable automatic dialing unit according to an embodiment of the present invention is now described. As shown in FIG. 2, this portable automatic dialing unit 1 is provided with a display 2 and a key manipulation part 3. The key manipulation part 3 includes a plurality of types of keys for inputting, outputting and retrieving data. The display 3 displays registered or retrieved data in registration or retrieval of data.

Functions of the respective keys provided in the key manipulation part 3 are now described. A numeric/nonnumeric input key group 3a is adapted to input numerals such as target telephone numbers and characters such as personal names and names of telephone companies. An input switch key 3b is adapted to switch a numeric input mode and a nonnumeric input mode in the numeric/nonnumeric input key group 3a. A "*" key 3c and a "#" key 3d are adapted to input symbolic codes "*" and "#" attached to SSN data. A "—" key 3e is adapted to input a symbol "—" inserted between codes of a telephone number. A space key 3f is adapted to input a code for a blank. A pause key 3g is adapted to input a pause code "P" for stopping transmission of dial tones for a constant period. A target key 3h is adapted to input symbols "[" and "]" for indicating a position for inserting a target telephone number. A registration key 3i is adapted to command registration of inputted data. A cursor position moving key group 3j is adapted to move the position of a cursor appearing on the display 2 for indicating an input position. Search keys 3k and 3m are adapted to retrieve registered data. An SSN key 3n is adapted to switch the portable automatic dialing unit 1 to an SSN mode. A dial key 3p is adapted to command transmission of registration data appearing on the display 2. ON and OFF keys 3q and 3r are adapted to command on-off operation of the portable automatic dialing unit 1. The key manipulation part 3 is additionally provided with various keys as needed. Referring to FIG. 2, the key manipulation part 3 is further provided with a local key 3s for transmitting local code and number of a registered telephone number, a slow key 3t for transmitting retrieved registration data in a period twice a preset time, a manual key 3u for manually transmitting an unregistered telephone number, a clear key 3v for clearing a display image on the display 2, a CE key 3w for deleting registered data and a memory check key 3x for confirming the number of registered data and the working condition of a memory.

Figure 3:
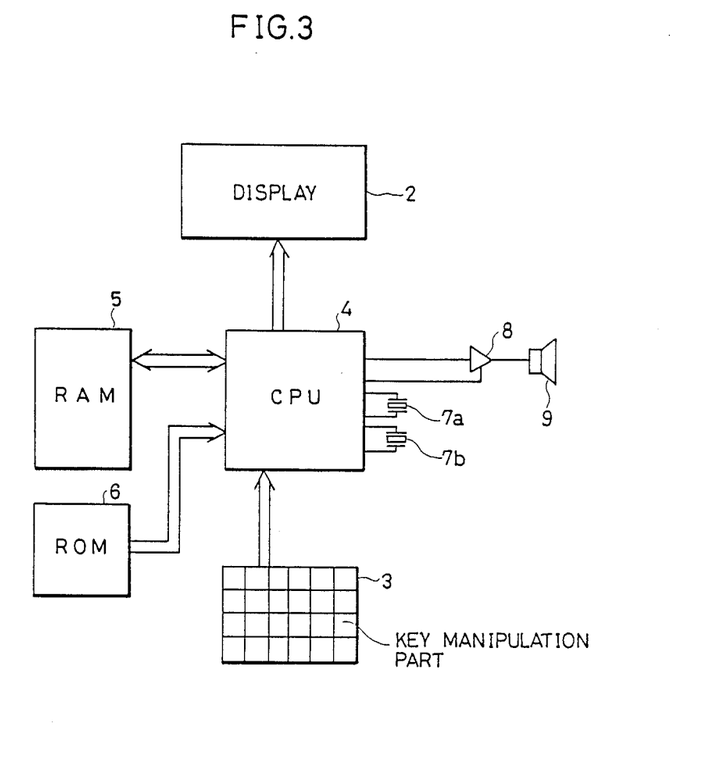
FIG. 3 is a schematic block diagram showing the structure of the portable automatic dialing unit according to the embodiment of the present invention.

FIG. 3 is a schematic block diagram showing an electric circuit part of the embodiment shown in FIG. 2. Referring to FIG. 3, a CPU 4 is connected with the display 2 and the key manipulation part 3. The CPU 4 is further connected with a RAM 5 and a ROM 6. The RAM 5 is adapted to store data inputted through the key manipulation part 3 and various additional data required for processing. The ROM 6 stores operation programs for the CPU 4. The CPU 4 is further connected with a vibrator 7a for generating operation clocks for the CPU 4 and another vibrator 7b employed for producing tone signals. The tone signals are audio frequency signals having the same frequencies as respective pushbutton signals of a pushbutton dialing telephone set, as hereinabove described. The tone signals produced on the basis of the vibrators 7a and 7b are amplified by an amplifier 8, and then supplied to a speaker 9. The speaker 9 is contained in the portable automatic dialing unit 1, to be opposed to its rear surface. A plurality of holes (not shown) are provided in the rear surface of the portable automatic dialing unit 1, in order to facilitate transmission of tones from the speaker 9.

In the aforementioned structure, the portable automatic dialing unit 1 has a telephone mode (first mode) and the SSN mode (second mode). The telephone mode is adapted to register and retrieve a general telephone number and a personal name, while the SSN mode is adapted to register and retrieve dial data for special telephone service. The portable automatic dialing unit is normally operated in the telephone mode, and is switched to the SSN mode when the user presses the SSN key 3n.

A manipulation method and operation of the aforementioned embodiment are now described. First, the user presses the ON key 3q to apply power to the portable automatic dialing unit 1. Then, a display image "NAME?" appears on the display 2. The user switches the input mode of the numeric/nonnumeric input key group 3a to the nonnumeric input mode through the input switch key 3b, and inputs a personal name through the numeric/nonnumeric input key group 3a. The inputted personal name is displayed on an upper stage of the display 2. When the personal name is completely inputted, the user switches the numeric/nonnumeric input key group 3a to the numeric input mode and manipulates the numeric/nonnumeric input key group 3a and the "—" key 3e, to input a target telephone number. The inputted target telephone number is displayed on a lower stage of the display 2. When the target telephone number is completely inputted, the user presses the registration key 3i, so that the personal name and the target telephone number appearing on the display 2 are written in the RAM 5 responsively. Thus, the personal name and the target telephone number are completely registered. Such registration is repeated to register a plurality of names and telephone numbers. This operation is performed in the telephone mode.

Figure 4A:
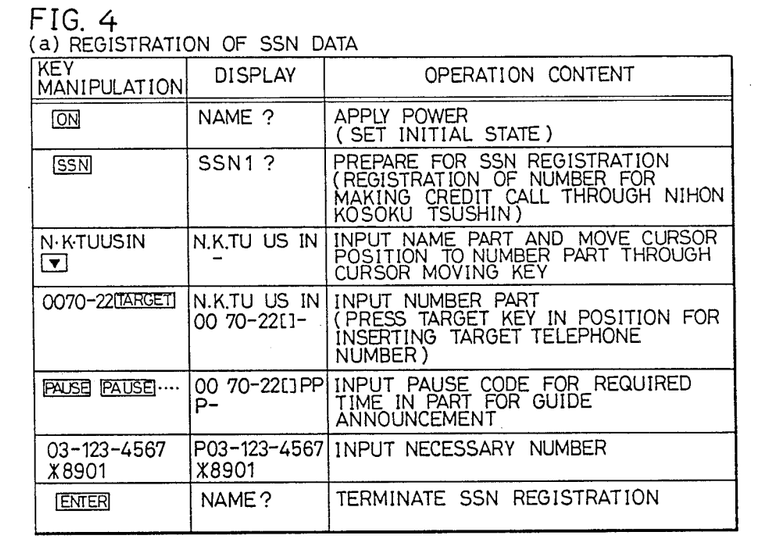
FIGS. 4(a) and 4(b) illustrates exemplary key manipulation in the embodiment shown in FIGS. 2 and 3 with displays and operation contents corresponding thereto.

With reference to FIG. 4(a), key manipulation and operation for registering data in the SSN mode are now described. FIG. 4(a) illustrates exemplary case of registering a series of numbers required for making a credit call through Nihon Kosoku Tsushin (one of the Japanese telephone companies) in a first SSN data registration area provided in the RAM 5. In order to make a credit call through Nihon Kosoku Tsushin, it is necessary to input an access code of Nihon Kosoku Tsushin, a credit call service code, a target telephone number, a pause code, a contract telephone number of the user, the "*" code and a password, as shown in the last column of FIG. 4(b). First, the user presses the ON key 3g to apply power to the portable automatic dialing unit 1. At this time, the display image "NAME?" appears on the display 2. Then, the user presses the SSN key 3n to switch the operation mode to the SSN mode. At this time, the CPU 4 prepares for registration of SSN data, and displays "SSN1?" on the display 2. The display content SSN1 indicates that the first SSN data registration area in the RAM 5 is currently specified. Then, the user switches the numeric/nonnumeric input key group 3a to the nonnumeric input mode through the input switch key 3b, to input a designation part of SSN data. In the example shown in FIG. 4(a), "N K TUUSIN" is inputted as the designation part of the SSN data. The inputted designation part is displayed on the upper stage of the display 2. Then the user manipulates the cursor position moving key group 3j to move the cursor position to the lower stage of the display 2, i.e., to a number part. Then, the user inputs number parts of the SSN data. In the example shown in FIG. 4(a), an access code (0070) of Nihon Kosoku Tsushin and a credit call service code (22) are first inputted. In the credit call through Nihon Kosoku Tsushin, it is necessary to input the target telephone number between the credit call service code and the contract telephone number of the user, as shown in the final column of FIG. 4(b). Therefore, the user presses the target key 3h following input of the credit call service code, to input data for specifying the position for inserting the target telephone number, so that the symbols "[" and "]" appear on the display 2. Further, the user presses the pause key 3g to input a pause code, in order to ensure a standby time for a guide announcement inserted by the telephone company between the target telephone number and the contract telephone number. While three pause codes are registered in the example shown in FIG. 4(b), the SSN data may be modified/registered to adjust the number of inputted pause codes, if the announcement time is mismatched with the currently inputted pause. In succession, other necessary dial data (contract telephone number of the user, the "*" code and the password) are inputted. The dial data thus inputted are displayed on the lower stage of the display 2, and if the number of digits of the dial data exceeds that of the display 2, the display contents are digitwisely scrolled to the left every input. Then, the user presses the registration key 3i, thereby to write the currently inputted designation and dial data in the first SSN data registration area of the RAM 5. Thus, the SSN data are completely registered. If additional SSN data must be registered, the aforementioned series of operation is repeated.

Figure 4B:
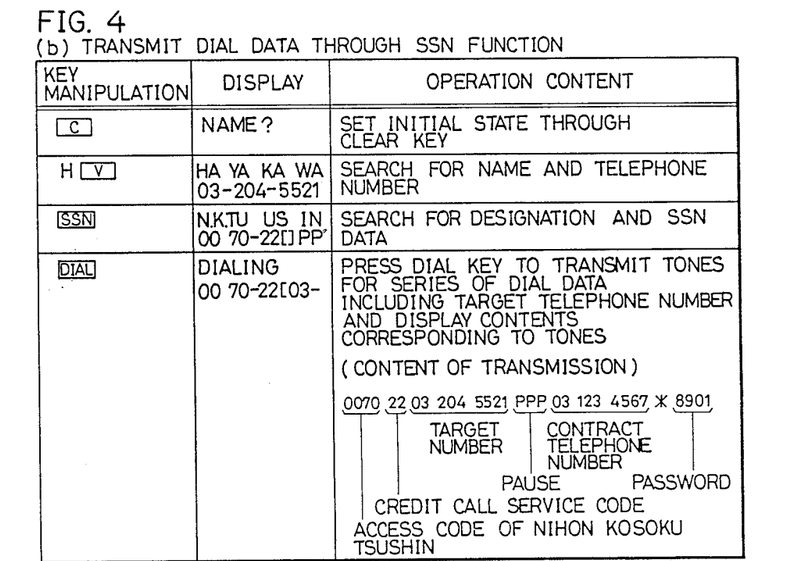
Figure 5:
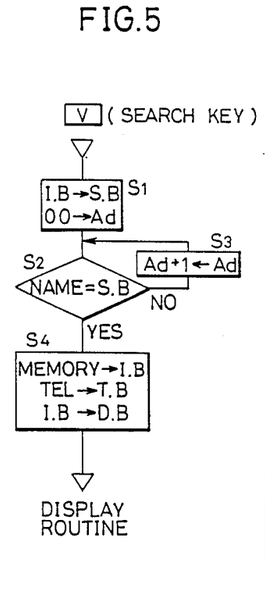
FIG. 5 is a flow chart for illustrating retrieval operation in the portable automatic dialing unit according to the embodiment of the present invention.

Manipulation and operation for automatically transmitting SSN data registered through the key manipulation shown in FIG. 4(a) are now described with reference to FIGS. 4(b), 5 and 6. First, the user presses the clear key 3v to set an initial state. At this time, "NAME?" appears on the display 2. Then, registered personal name and target telephone number are retrieved in the telephone mode. In order to start such retrieval operation, the user inputs an initial (H in FIG. 4(b)) of the personal name and presses the search key 3k or 3m. FIG. 5 is a flow chart showing the retrieval operation in detail. First, the initial of the personal name inputted through the numeric/nonnumeric input key group 3a is temporarily loaded in an input buffer IB. This input buffer IB is a memory which is provided in the RAM 5, for example, for temporarily storing data to be indicated such as input data of a name and a target telephone number and data retrieved and read from the RAM 5. When the search key 3k or 3m is pressed, the initial loaded in the input buffer IB is transferred to a search buffer SB, and a search address is initialized (step S1). The search buffer SB is a memory which is provided in the RAM 5, for example, for temporarily storing information for retrieval. Then, at a step S2, a name part of the corresponding address is read from the RAM 5, and the initial thereof is compared with that loaded in the search buffer SB. If the initials are mismatched, the search address of an address pointer Ad is updated by one at a step S3, and name data in a next area is compared with the storage content of the search buffer SB again at the step S2. If coincidence of the initial of name data read from the RAM 5 and that of the name stored in the search buffer SB is decided upon repetition of the steps S2 and S3, the process is advanced to a step S4. At the step S4, the corresponding name and target telephone number are read from the RAM 5, and loaded in the input buffer IB. The target telephone number is also loaded in a target buffer TB. Further, the storage content of the input buffer IB is transferred to a display buffer DB. The target buffer TB and the display buffer DB are provided in the RAM 5, for example. The name and telephone number read from the RAM 5 through the retrieval operation are converted to display data in the display buffer DB. Thus, the display 2 displays the retrieved name and telephone number.

Then, the user presses the SSN key 3n to switch the operation mode to the SSN mode, thereby to read prescribed SSN data. The CPU 4, which reads SSN data from the SSN data registration area of the RAM 5 in response to the pressed SSN key 3n and displays the same on the display 2, updates a read address of the SSN data registration area every time the SSN key 3n is pressed. Thus, SSN data registered in a next area is read every time the SSN key 3n is pressed, to appear on the display 2. When the SSN key 3n is pressed after SSN data of the final area is displayed, the SSN data in the first area is again read. Retrieval of the SSN data is completed when corresponding SSN data appears on the display 2.

Figure 6:
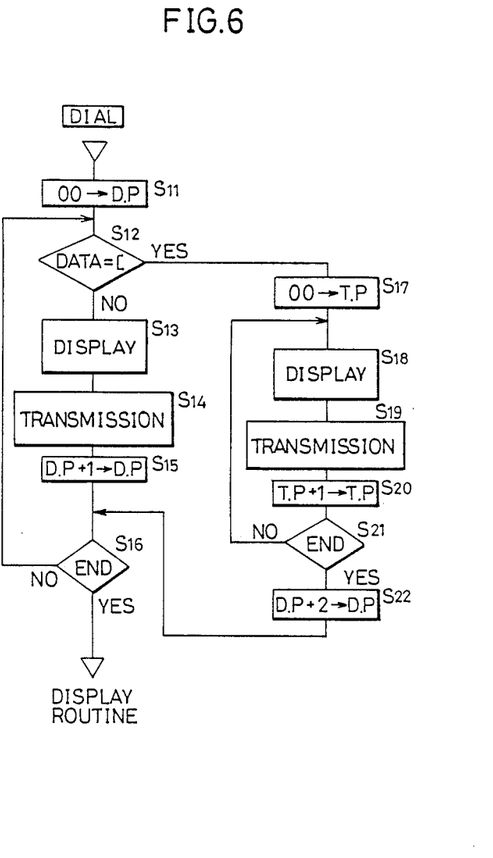
FIG. 6 is a flow chart for illustrating automatic dialing operation in an SSN mode in the portable automatic dialing unit according to the embodiment of the present invention.

Then, the user presses the dial key 3p, so that the portable automatic dialing unit 1 enters automatic dialing operation shown in FIG. 6. At a step S11, zero is set in a data pointer DP. The data pointer DP is provided in the RAM 5, for example, to specify the digit of dial data to be subsequently transmitted within a plurality of dial data included in the SSN data. Therefore, the zero digit, i.e., the first digit is initially specified. At a step S12, a decision is made as to whether or not the dial data of the digit specified by the data pointer DP is the symbol data "[" inputted through the target key 3h. In other words, a decision is made as to whether or not the target telephone number is inserted in this position. Since the dial data of the first digit is the access code of Nihon Kosoku Tsushin as shown in FIG. 4(b), a decision of no is made at the step S12 and the process is advanced to a step S13. At the step S13, the dial data of the currently specified digit is displayed. Then, at a step S14, the displayed dial data is transmitted. That is, the CPU 4 produces a tone signal corresponding to the dial data of the digit specified by the data pointer DP. This tone signal is supplied to the speaker 9 through the amplifier 8. As hereinabove described, this tone signal is an audio frequency signal having the same frequency as the pushbutton signal of a pushbutton dialing telephone set. Thus, the speaker 9 outputs the tone for the first digit. At this time, the portable automatic dialing unit 1 is attached to the mouthpiece of a telephone set, whereby the tone outputted from the speaker 9 is again converted to the dial signal by the telephone set and transmitted to a telephone line. Then, at a step S15, the data pointer DP is updated. At a step S16, a decision is made as to whether or not processing of the final digit of the SSN data is completed. If processing of the final digit is not completed, the process is returned to the step S12, to repeat the display processing at the step S13 and the transmission processing at the step S14.

When the display processing for the access code of Nihon Kosoku Tsushin and the credit call service code and tone transmission processing are thus completed, a decision is made at the step S12 that the data pointer DP specifies the digit of symbol data "[" inputted by the target key 3h, and the process is advanced to a step S17. At the step S17, zero is set in a target pointer TP. This target pointer TP is provided in the RAM 5, for example, to specify the digit of the number to be subsequently transmitted within the target telephone number loaded in the target buffer TB in the retrieval operation shown in FIG. 5. Then, the number of the first digit of the target telephone number loaded in the target buffer TB is displayed at a step S18 and transmitted at a step S19. Thereafter the target pointer TP is updated at a step S20, and a decision is made at a step S21 as to whether or not transmission of the target telephone number is completed. Since transmission of the target telephone number is not yet completed, the steps S18 to S20 are repeated. When a decision is made at the step S21 that display and transmission of the final digit of the target telephone number are completed, the process is advanced to a step S22. At the step S22, "2" is added to the data pointer DP, since processing of the two symbol codes "[" and "]" inputted through the target key 3h is completed. Then the process is returned to the step S16, to decide whether or not processing of the SSN data is completed. Since the SSN data is not yet completely processed, the process is returned to the step S12. Thereafter pause processing, display processing and transmission processing corresponding to the pause code, the contract telephone number and the password are executed. When the final digit of the password is completely processed, a decision is made at the step S16 that the SSN data are completely processed, to terminate the automatic dialing operation.

While the above embodiment has been described with reference to the case of inserting the target telephone number between the credit call service code and the contract telephone number, the target telephone number can be inserted in an arbitrary position of the SSN data by changing the position for manipulating the target key 3h.

A second embodiment of the present invention is now described. The visual structure and the structure of an internal electric circuit part of the second embodiment are similar to those of the first embodiment shown in FIGS. 2 and 3. The second embodiment is different in action from the first embodiment, since an operation program stored in the ROM 6 shown in FIG. 3 is different from that of the first embodiment.

A manipulation method and operation of the second embodiment are now described.

In order to register a telephone number for a long-distance call, the user first inputs a personal name in the telephone mode, through the numeric/nonnumeric key group 3a of the key manipulation part 3. At this time, the numeric/nonnumeric key group 3a is switched to the nonnumeric input mode through the input switch key 3b. The inputted personal name appears on the upper stage of the display 2. Then the user manipulates the cursor moving key group 3j to move the cursor position to the lower stage of the display 2. If the personal name is inputted up to the final digit of the upper stage, i.e., up to the 12-th character, the cursor position is automatically moved to the lower stage for displaying the telephone number. Then the user inputs the identification number "1" for a long-distance call through the numeric/nonnumeric key group 3a. At this time, the numeric/nonnumeric key group 3a is switched to the numeric input mode through the input switch key 3b. Then, the user inputs "—" through the hyphen key 3e in order to make the display content clearly understandable. However, it is not requisite to input this symbol "—". Then the user inputs the target telephone number through the numeric/nonnumeric key group 3a. The identification number "1" and the target telephone number thus inputted are displayed on the lower stage of the display 2. Upon input of the target telephone number, the user presses the registration key 3i. Thus, the personal name and the telephone number (including the identification number "1") appearing on the display 2 are registered in the RAM 5.

A method of registering SSN data for using calling card dialing service is now described. First, the user presses the SSN key 3n so that the unit enters an SSN mode. Then, after inputting a personal name, the user inputs "0-U" in the lower stage of the display 2, i.e., the telephone number display part and thereafter inputs the pause code "P" and the calling card number. Then the user manipulates the registration key 3 to register the inputted data in the RAM 5. The symbol "U", which is inputted through the target key 3h, indicates that the target telephone number is inserted in this part. The pause code "P", which is inputted through the pause key 3g, is adapted to command a pause state for a prescribed period. The SSN data for the calling card dialing service thus registered can be commonly used with respect to a plurality of target telephone numbers inputted in the aforementioned manner.

Figure 7:
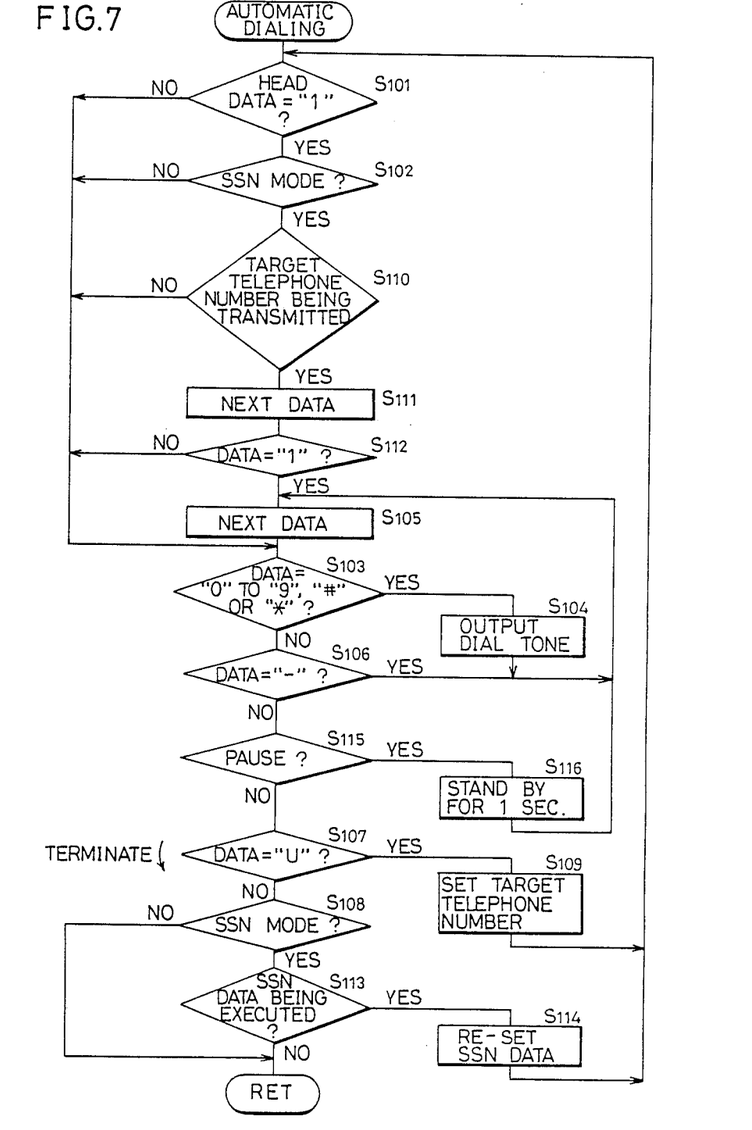
FIG. 7 is a flow chart for illustrating automatic dialing operation in a portable automatic dialing unit according to a second embodiment of the present invention.
Figure 8:
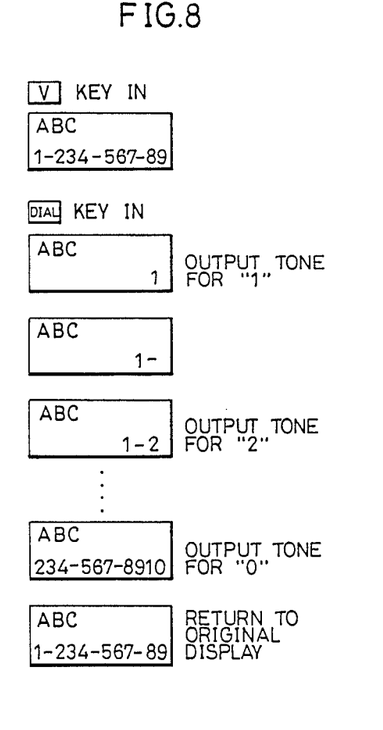
FIG. 8 illustrates exemplary display contents in the case of making a general long-distance call in the second embodiment of the present invention.

With reference to a flow chart shown in FIG. 7 and exemplary display contents shown in FIG. 8, description is now made on retrieval and automatic dialing for a general long-distance call. First, the user manipulates the search key 3k or 3m, to retrieve a corresponding telephone number. That is, the user presses the search key 3k or 3m so that personal names and telephone numbers registered in the telephone mode are sequentially read from the RAM 5 and displayed on the display 2. When the target name and telephone number appear on the display 2, the user presses the dial key 3p so that the unit enters the automatic dialing operation shown in FIG. 7.

At a step S101, a decision is made as to whether or not the head data of the retrieved telephone number is "1". Since the long-distance identification number "1" is registered at the head of the telephone number, a decision of yes is made at the step S101 and the process is advanced to a step S102. At the step S102, a decision is made as to whether or not the unit is in the SSN mode. Since the portable automatic dialing unit 1 is driven in the telephone mode at this time, a decision of no is made and the process is advanced to a step S103. At the step S103, a decision is made as to which one of the data "0" to "9", "#" and "*" is currently referred to. Since the head data "1" is currently referred to, the process is advanced to a step S104, at which a tone signal corresponding to "1" is produced in the CPU 4 and supplied to the speaker 9 through the amplifier 8. Thus, the speaker 9 outputs a tone corresponding to a signal for a pushbutton "1" of a pushbutton dialing telephone set. At this time, the mouthpiece of a telephone set is in contact with the rear surface of the portable automatic dialing unit 1 to receive the tone derived from the speaker 9. Therefore, the tone outputted from the speaker 9 is converted to a tone signal by the telephone set and transmitted to a telephone line. Then the process is advanced to a step S105, to refer to next data. Since "—" is referred to at this time, a decision is made that the data currently referred to is "—" at a step S106 via the step S103. In this case, no tone signal is outputted at the step S104 but the process is advanced to the step S105, to refer to next data. Namely, no operation is performed in this case since the hyphen "—" is simply inserted for facilitating easy understanding of the display content, as hereinabove described. Thereafter the steps S105, S103 and S104 are repeated to transmit the tones corresponding to the target telephone number. If "—" is inserted between codes, the operation for outputting the dial tone signal (step S104) is skipped by the step S106 as hereinabove described. The tone signals corresponding to the target telephone number thus produced are transmitted to the telephone line through the mouthpiece of the telephone set, similarly to the aforementioned head number "1". Thus, the tone signals drive a telephone switchboard to connect the telephone line to another telephone set having the telephone number corresponding to the signals. When the tone signals are completely outputted, the process is advanced to a step S107 via a step S115, to decide whether or not next reference data is "U". Since no data is registered as next reference data, a decision of no is made at the step S107 and the process is advanced to a step S108. At the step S108, a decision is made as to whether or not the unit is in the SSN mode. Since the portable automatic dialing unit 1 is in the telephone mode at this time, a decision of no is made so that the automatic dialing operation is terminated and the process is returned to another main flow (not shown).

Figure 9:
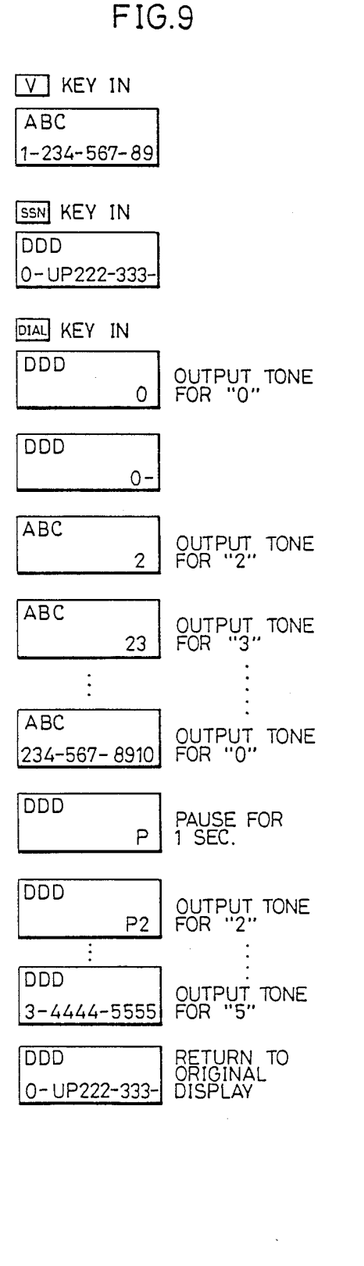
FIG. 9 illustrates exemplary display contents in the case of making a long-distance call through calling card dialing service in the second embodiment of the present invention.

With reference to FIGS. 7 and 9, description is now made on retrieval and automatic dialing for making a long-distance call through calling card dialing service. First, the user manipulates the search key 3k or 3m to retrieve corresponding personal name and telephone number. This retrieval operation is similar to that in the aforementioned generally long-distance call. When the name and the telephone number are retrieved, the user presses the SSN key 3n so that the unit enters the SSN mode. Then the user manipulates the search key 3k or 3m to retrieve a calling card number from a plurality of types of dial data for special telephone service, which are generally registered in such a portable automatic dialing unit 1 in the SSN mode. When the calling card number is retrieved, the user presses the dial key 3p so that the unit enters the automatic dialing operation shown in FIG. 7.

At the step S101, a decision is made as to whether or not the head data is "1". Since "O-UP calling card number" is registered as the data for calling card dialing service as hereinabove described, the head data is "0". Therefore, a decision of no is made at the step S101 and a dial tone corresponding to the head data "0" is outputted at the step S104 via the step S103. Then, next data is referred to at the step S105. The next data is "−" and a decision is made on this at the step S106 via the step S103. At this time, no tone is outputted but the process is returned to the step S105 to refer to next data. The next data is "U" and a decision is made that the data currently referred to is "U" at the step S107 via the step S115, after operation at the steps S103 and S106. Then, the process is advanced to a step S109, to set the target telephone number retrieved in the telephone mode immediately before the SSN mode. The long-distance identification number "1" is added to the head of the target telephone number set at this time. Thus, a decision is made that the head data is "1" at the step S101 after the step S109, and the process is advanced to the step S102. At the step S102, a decision is made that the unit is in the SSN mode at this time, and the process is advanced to a step S110. At the step S110, a decision is made as to whether or not transmission of the target telephone number is currently executed. Since the transmission processing of the target telephone number is currently executed, the process is advanced to a step S111 to refer to next data. The next data is "−" and a decision is made on this at a step S112, and the next data is referred to at the step S105. Succeeding data is the target telephone number (excluding the head data "0"). Tones corresponding to the telephone number are outputted at the steps S105, S103, S104 and S106.

In the automatic dialing operation for calling card dialing service as hereinabove described, the identification number "1" added to the head of the telephone number for a long-distance call registered in the telephone mode is automatically deleted and replaced by the identification number "0" for calling card dialing service. When the tones for the target telephone number are completely outputted, the pause code "P" is subsequently referred to at the step S105. Therefore, the pause code "P" is decided at the step S115 via the steps S103 and S106, and a standby process is made for one second at a step S116. Thereafter a decision is made that the unit is in the SSN mode at the step S108 via the steps S105, S103, S106, S115 and S107, and the process is advanced to a step S113. At the step S113, a decision is made as to whether or not execution of SSN data is completed. Since execution of the SSN data is not yet completed at this time, the process is advanced to a step S114. At the step S114, the calling card number is set as the final part of the SSN data. Then the process is returned to the step S103 through operation at the steps S101, S102 and S110. Thereafter tones corresponding to the calling card number are outputted through an operation loop formed by the steps S103 to S106. When the operation for outputting the tones for the calling card number is completed, the process is advanced to the step S113 via the steps S115, S107 and S108, to decide termination of the SSN data execution. Thus, the process is returned to the main flow (not shown).

Although the calling card number is automatically outputted as tones in the SSN mode in the aforementioned embodiment, transmission of the calling card number is not necessary in the case of making a telephone call through a public telephone provided with a card reader, since the calling card number recorded in the calling card is read and automatically transmitted to a center. In order to cope with such a telephone set provided with a card reader, therefore, "0-U" may be registered in the SSN mode independently of 37 0-UP calling card number". When a telephone call is made through the public telephone provided with a card reader, the former SSN data is retrieved for automatic dialing, and no calling card number is transmitted at this time since the SSN data includes no calling card number.

While the above description has been made mainly with reference to a long-distance call, the present invention is also applicable to a local call. As to a general local call, only a target telephone number (including no identification number "1" at the head) is registered in the telephone mode. As to a local call through calling card dialing service, registration and automatic dialing operation are identical to those for a long-distance call through the calling card dialing service.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A portable automatic dialing unit for converting predetermined data to tones and transmitting the tones, said portable automatic dialing unit comprising:

data input means for inputting dial data and data relating thereto;

registration means for registering said data inputted by said data input means;

retrieval means for retrieving desired data from said dial data registered in said registration means;

tone signal producing means for producing corresponding tone signals on the basis of said dial data retrieved by said retrieval means;

a speaker for converting said tone signals to tones and outputting the same to the exterior of the unit; and mode switching means for switching an operation mode of the unit between first and second modes, said first mode including means for registering and retrieving target telephone number data, said second mode including means for registering and retrieving dial data for special telephone service, said data input means including means for inputting insertion position specifying data indicating a position of dial data registered in said second mode for inserting a target telephone number in the insertion position, said tone signal producing means including data insertion means for inserting said target telephone number data retrieved in said first mode in said position specified by said insertion position specifying data when said dial data retrieved in said second mode includes said insertion position specifying data.

2. A portable automatic dialing unit in accordance with claim 1, wherein said retrieval means retrieves dial data on the basis of retrieval data inputted from said data input means.

3. A portable automatic dialing unit in accordance with claim 1, wherein said retrieval means includes memory means for temporarily storing said target telephone number data retrieved in said first mode, and said data insertion means inserts said target telephone number data stored in said memory means in said position specified by said insertion position specifying data.

4. A portable automatic dialing unit for converting previously registered dial data to tones and transmitting the tones, said portable automatic dialing unit comprising:

data input means for inputting dial data and data relating thereto;

registration means for registering said data inputted by said data input means;

retrieval means for retrieving desired dial data from said dial data registered in said registration means;

tone signal producing means for producing corresponding tone signals on the basis of said dial data retrieved by said retrieval means;

a speaker for converting said tone signals to tones and outputting the same to the exterior of the unit; and mode switching means for switching an operation mode of the unit between first and second modes, said first mode including means for registering and retrieving dial data for special telephone service, a predetermined identification number being added to a telephone number for a long-distance call registered in said first mode, said tone signal producing means further including deletion means for deleting said identification number from a retrieved telephone number for a long-distance call when said telephone number for a long-distance call is retrieved in said first mode and prescribed dial data for special telephone service is retrieved in said second mode.

5. A portable automatic dialing unit for convertion predetermined dial data to tones and transmitting the tones, said portable automatic dialing unit comprising:

data input means for inputting dial data and data relating hereto;

registration means for registering said data inputted by said data input means;

retrieving means for retrieving desired data from said dial data registered in said registration means;

tone signal producing means for producing corresponding tone signals on the basis of said dial data retrieved by said retrieval means;

a speaker for converting said tone signals to tones and outputting the same to the exterior of the unit; and mode switching means for switching an operation mode of the unit between first and second modes, said first mode including means for registering and retrieving target telephone number data, said second mode including means for registering and retrieving dial data for special telephone service.

said data input means including means for inputting insertion position specifying data indicating a position of dial data registered in said second mode for inserting a target telephone number in the insertion position, said tone signal producing means including data insertion means for inserting said target telephone number data retrieved in said first mode in said position specified by said insertion position specifying data when said dial data retrieved in said second mode includes said insertion position specifying data; and said data input means including means for inputting insertion position specifying data includes means for variably selecting the insertion position for inserting a target telephone number in the registered data of the second mode.

6. A portable automatic dialing unit for converting predetermined dial data to tones and transmitting the tones, said portable automatic dialing unit comprising:

data input means for inputting dial data and data relating hereto;

registration means for registering said data inputted by said data input means;

retrieval means for retrieving desired data from said dial data registered in said registration means;

tone signal producing means for producing corresponding tone signals on the basis of said dial data retrieved by said retrieval means;

a speaker for converting said tone signals to tones and outputting the same to the exterior of the unit; and mode switching means for switching an operation mode of the unit between first and second modes, said first mode including means for registering and retrieving target telephone number data, said second mode including means for registering and retrieving dial data for special telephone service, said data input means including means for inputting insertion position specifying data indicating a position of dial data registered in said second mode for inserting a target telephone number in the insertion position, said tone signal producing means including data insertion means for inserting said target telephone number data retrieved in said first mode in said position specified by said insertion position specifying data when said dial data retrieved in said second mode includes said insertion position specifying data; and said special telephone service includes a credit call service code and a contract number and said insertion position is between said credit call service code and said contract number.

7. A portable automatic dialing unit for converting predetermined dial data to tones and transmitting the tones, said portable automatic dialing unit comprising:

data input means for inputting dial data and data relating hereto;

registering means for registering said data inputted by said data input means;

retrieval means for retrieving desired data from said dial data registered in said registration means;

tone signal producing means for producing corresponding tone signals on the basis of said dial data retrieved by said retrieval means;

a speaker for converting said tone signals to tones and outputting the same to the exterior of the unit; and mode switching means for switching an operation mode of the unit between first and second modes, said first mode including means for registering and retrieving target telephone number data, said second mode including means for registering and retrieving dial data for special telephone service, said data input means including means for inputting insertion position specifying data indicating a position of dial data registered in said second mode for inserting a target telephone number in the insertion position, said tone signal producing means including data insertion means for inserting said target telephone number data retrieved in said first mode in said position specified by said insertion position specifying data when said dial data retrieved in said second mode includes said insertion position specifying data; and said means for inputting the insertion position includes a target key.

* * * * *